United States Patent
Obeng et al.

(10) Patent No.: US 6,579,604 B2
(45) Date of Patent: Jun. 17, 2003

(54) METHOD OF ALTERING AND PRESERVING THE SURFACE PROPERTIES OF A POLISHING PAD AND SPECIFIC APPLICATIONS THEREFOR

(75) Inventors: Yaw S. Obeng, Orlando, FL (US); Edward M. Yokley, Pembroke Pines, FL (US)

(73) Assignee: PsiloQuest Inc., Orlando, FL (US)

( * ) Notice: Subject to any disclaimer, the term of this patent is extended or adjusted under 35 U.S.C. 154(b) by 0 days.

(21) Appl. No.: 09/994,407

(22) Filed: Nov. 27, 2001

(65) Prior Publication Data

US 2002/0115734 A1 Aug. 22, 2002

Related U.S. Application Data

(60) Provisional application No. 60/304,375, filed on Jul. 10, 2001, provisional application No. 60/295,315, filed on Jun. 1, 2001, and provisional application No. 60/250,299, filed on Nov. 29, 2000.

(51) Int. Cl.[7] .................................................. B32B 27/00
(52) U.S. Cl. .................... 428/319.3; 428/318.4; 428/319.1; 428/412; 428/423.1; 428/474.4; 428/475.8; 428/477.7; 428/480; 428/688; 428/689; 428/698; 428/702; 428/704; 264/413; 264/414; 264/423; 451/57; 451/58
(58) Field of Search ............................ 428/304.4, 306.6, 428/308.4, 318.4, 319.1, 319.3, 412, 423.1, 457, 458, 474.4, 475.8, 477.7, 480, 688, 689, 698, 702, 704; 264/413, 414, 423; 451/57, 58

(56) References Cited

U.S. PATENT DOCUMENTS 3,841,031 A  *  10/1974  Walsh ......................... 451/41
4,346,142 A      8/1982   Lazear
4,446,254 A      5/1984   Nakae et al.
4,613,345 A      9/1986   Thicke et al.

(List continued on next page.)

FOREIGN PATENT DOCUMENTS

| EP | 0 104 608 | 4/1984 | |
|----|-----------|--------|---|
| EP | 0 352 199 | 1/1990 | |
| EP | 0 884 349 A1 | 12/1998 | |
| JP | 58 064948 | 4/1983 | |
| JP | 01 064776 | 3/1989 | |
| JP | 08 078369 | 3/1996 | |
| JP | 9132661   * | 5/1997 | C08J/9/06 |
| JP | 11 245164 | 9/1999 | |
| WO | WO 9605602 A1 | 2/1996 | |
| WO | WO 96/23834 | 8/1996 | |
| WO | WO 99/10129 | 3/1999 | |
| WO | WO 9962673 | 12/1999 | |

*Primary Examiner*—James J. Seidleck
*Assistant Examiner*—Travis B Ribar
(74) *Attorney, Agent, or Firm*—Hitt Gaines & Boisbrun, PC

(57) ABSTRACT

The present invention is directed, in general, to an improved material and method of planarizing a surface on a semiconductor wafer and, more specifically, to a method of altering the properties of polymers, preferably thermoplastic foam polymers, used in polishing applications. The chemical and mechanical properties thermoplastic foam substrates can be transformed by inorganic, inorganic-organic, and or organic—organic grafting techniques, such that the polymer foam is endowed with new set of properties that more desirable and suitable for polishing.

47 Claims, 1 Drawing Sheet

U.S. PATENT DOCUMENTS

| | | |
|---|---|---|
| 4,845,132 A | 7/1989 | Masuoka et al. |
| 4,852,646 A | 8/1989 | Dittmer et al. |
| 4,946,903 A | 8/1990 | Gardella, Jr. et al. |
| 5,266,309 A | 11/1993 | Gardella, Jr. et al. |
| 5,461,101 A | 10/1995 | Rothon et al. |
| 5,510,174 A | 4/1996 | Litman |
| 5,624,303 A | 4/1997 | Robinson |
| 5,627,079 A | 5/1997 | Gardella, Jr. et al. |
| 5,696,207 A | 12/1997 | Vargo et al. |
| 5,814,567 A | 9/1998 | Yahiaoui et al. |
| 5,849,368 A * | 12/1998 | Hostettler et al. .......... 427/536 |
| 5,945,486 A | 8/1999 | Vargo et al. |
| 5,951,374 A * | 9/1999 | Kato et al. .................... 451/41 |
| 5,968,377 A * | 10/1999 | Yuasa et al. ........... 219/121.41 |
| 5,993,917 A * | 11/1999 | Pan et al. ................... 427/536 |
| 6,063,306 A | 5/2000 | Kaufman et al. |
| 6,099,954 A | 8/2000 | Urbanavage et al. |
| 6,132,298 A | 10/2000 | Zunigna et al. |
| 6,267,644 B1 | 7/2001 | Molnar |
| 6,283,829 B1 | 9/2001 | Molnar |
| 6,291,349 B1 | 9/2001 | Molnar |
| 6,293,851 B1 | 9/2001 | Molnar |
| 6,346,202 B1 | 2/2002 | Molnar |
| 6,354,915 B1 | 3/2002 | James et al. |
| 6,358,569 B1 * | 3/2002 | Badyal et al. .............. 427/490 |
| 6,364,749 B1 * | 4/2002 | Walker ........................ 451/41 |
| 6,413,153 B1 | 7/2002 | Molar |
| 6,428,388 B2 | 8/2002 | Molnar |
| 6,435,948 B1 * | 8/2002 | Molnar ........................ 451/41 |
| 2001/0014570 A1 * | 8/2001 | Wenski et al. ................ 451/41 |

\* cited by examiner

METHOD OF ALTERING AND PRESERVING THE SURFACE PROPERTIES OF A POLISHING PAD AND SPECIFIC APPLICATIONS THEREFOR

CROSS-REFERENCE TO PROVISIONAL APPLICATION

This application claims the benefit of U.S. Provisional Application No. 60/250,299 entitled, "SUBSTRATE POLISHING DEVICE AND METHOD," to Edward M. Yokley, filed on Nov. 29, 2000; U.S. Provisional Application No. 60/295,315 entitled, "A METHOD OF ALTERING PROPERTIES OF A POLISHING PAD AND SPECIFIC APPLICATIONS THEREFOR," to Yaw S. Obeng and Edward M. Yokley, filed on Jun. 1, 2001; and U.S. Provisional Application No. 60/304,375 entitled, "A METHOD OF ALTERING PROPERTIES OF A THERMOPLASTIC FOAM POLISHING PAD AND SPECIFIC APPLICATIONS THEREFOR," to Yaw S. Obeng and Edward M. Yokley, filed on Jul. 10, 2001, which are commonly assigned with the present invention and incorporated herein by reference as if reproduced herein in its entirety.

TECHNICAL FIELD OF THE INVENTION

The present invention is directed to polishing pads used for creating a smooth, ultra-flat surface on such items as glass, semiconductors, dielectric/metal composites, magnetic mass storage media and integrated circuits. More specifically, the present invention relates to grafting and preserving the grafted surface of polymers, preferably thermoplastic foam polymers, thereby transforming their mechanical and chemical properties to create more suitable polishing pads therefrom.

BACKGROUND OF THE INVENTION

Chemical-mechanical polishing (CMP) is used extensively as a planarizing technique in the manufacture of VLSI integrated circuits. It has potential for planarizing a variety of materials in IC processing but is used most widely for planarizing metallizied layers and interlevel dielectrics on semiconductor wafers, and for planarizing substrates for shallow trench isolation.

In trench isolation, for example, large areas of field oxide must be polished to produce a planar starting wafer. Integrated circuits that operate with low voltages, i.e., 5 volts or less, and with shallow junctions, can be isolated effectively with relatively shallow trenches, i.e., less than a micron. In shallow trench isolation (STI) technology, the trench is backfilled with oxide and the wafer is planarized using CMP. The result is a more planar structure than typically obtained using LOCOS, and the deeper trench (as compared with LOCOS) provides superior latch up immunity. Also, by comparison with LOCOS, STI substrates have a much reduced "birds' beak" effect and thus theoretically provide higher packing density for circuit elements on the chips. The drawbacks in STI technology to date relate mostly to the planarizing process. Achieving acceptable planarization across the full diameter of a wafer using traditional etching processes has been largely unsuccessful. By using CMP, where the wafer is polished using a mechanical polishing wheel and a slurry of chemical etchant, unwanted oxide material is removed with a high degree of planarity.

Similarly, integrated circuit fabrication on semiconductor wafers require the formation of precisely controlled apertures, such as contact openings or "vias," that are subsequently filled and interconnected to create components and very large scale integration (VLSI) or ultra large scale integration (ULSI) circuits. Equally well known is that the patterns defining such openings are typically created by optical lithographic processes that require precise alignment with prior levels to accurately contact the active devices located in those prior levels. In multilevel metallization processes, each level in the multilevel structure contributes to irregular topography. In three or four level metal processes, the topography can be especially severe and complex. The expedient of planarizing the interlevel dielectric layers, as the process proceeds, is now favored in many state of the art IC processes. Planarity in the metal layers is a common objective, and is promoted by using plug interlevel connections. A preferred approach to plug formation is to blanket deposit a thick metal layer on the interlevel dielectric and into the interlevel windows, and then remove the excess using CMP. In a typical case, CMP is used for polishing an oxide, such as $SiO_2$, $Ta_2O_5$, $W_2O_5$. It can also be used to polish nitrides such as $Si_3N_4$, TaN, TiN, and conductor materials used for interlevel plugs, such as W, Ti, TiN.

CMP generally consists of the controlled wearing of a rough surface to produce a smooth specular finished surface. This is commonly accomplished by rubbing a pad against the surface of the article, or workpiece, to be polished in a repetitive, regular motion while a slurry containing a suspension of fine particles is present at the interface between the polishing pad and the workpiece. Commonly employed pads are made from felted or woven natural fibers such as wool, urethane-impregnated felted polyester or various types of filled polyurethane plastic.

A CMP pad ideally is flat, uniform across its entire surface, resistant to the chemical nature of the slurry and have the right combination of stiffness and compressibility to minimize effects like dishing and erosion. In particular, there is a direct correlation between lowering Von Mises stress distributions in the pad and improving polishing pad removal rates and uniformity. In turn, Von Mises stresses may be reduced though the controlled production of pad materials of uniform constitution, as governed by the chemical-mechanical properties of the pad material.

CMP pad performance optimization has traditionally involved the empirical selection of materials and use of macro fabrication technologies. For example, a pad possessing preexisting desirable porosity or surface texture properties may be able to absorb particulate matter such as silica or other abrasive materials. Or, patterns of flow channels cut into the surface of polishing pads may improve slurry flow across the workpiece surface. The reduction in the contact surface area effected by patterning also provides higher contact pressures during polishing, further enhancing the polishing rate.

Alternatively, intrinsic microtextures may be introduced into pads by using composite or multilayer materials possessing favorable surface textures as byproduct of their method of manufacture. Favorable surface microtextures may also be present by virtue of bulk non-uniformities introduced during the manufacturing process. When cross-sectioned, abraded, or otherwise exposed, these bulk non-uniformities become favorable surface microtextures. Such inherent microtextures, present prior to use, may permit the absorption and transport of slurry particles, thereby providing enhanced polishing activity without the need to further add micro- or macrotextures.

There are, however, several deficiencies in polishing pad materials selected or produced according to the above-described empirical techniques. Pads made of layers of polymer material may have thermal insulating properties, and therefore unable conduct heat away from the polishing surface, resulting in undesirable heating during polishing. Numerous virgin homogenous sheets of polymers such as polyurethane, polycarbonate, nylon, polyureas, felt, or polyester, have poor inherent polishing ability, and hence not used as polishing pads. In certain instances, mechanical or chemical texturing may transform these materials, thereby rendering them useful in polishing.

However, polyurethane based pads, currently in widespread use, are decomposed by the chemically aggressive processing slurries by virtue of the inherent chemical nature of urethane. This decomposition produces a surface modification in and of itself in the case of the polyurethane pads.

Yet another approach involves modifying the surface of CMP polishing pads materials to improve the wetability of the pad surface, the adhesion of surface coatings, and the application performance of these materials. Plasma treatment of polishing pad materials is one means to functionalize and thereby modify polishing pad surfaces. However, the simple functionalization of pad surfaces by plasma treatment is known to be a temporary effect, with spontaneous loss of functionalization after one to two days. While some success in the preservation of functionalized pad surfaces has been obtained for fluorinated polymeric surfaces, this has not been demonstrated for other polymeric surfaces, and in particular, thermoplastics.

Accordingly, what is needed in the art is an improved process for functionalizing and preserving a semiconductor wafer thermoplastic polishing pad surface, thereby providing a rapid rate of polishing and yet reducing scratches and resultant yield loss during chemical/mechanical planarization.

SUMMARY OF THE INVENTION

To address the deficiencies of the prior art, the present invention, in one embodiment, provides a polymer, preferably thermoplastic foam polymer, comprising a thermoplastic foam substrate having a modified surface thereon and a grafted surface on the modified surface.

In another embodiment, the present invention provides a method for preparing a polymer, preferably a thermoplastic foam polymer. The method comprises the steps of providing a thermoplastic foam substrate, exposing the substrate to an initial plasma reactant to produce a modified surface thereon, and exposing the modified surface to a secondary plasma reactant to create a grafted surface on the modified surface.

Yet another embodiment provides a method of manufacturing a polishing pad. The method comprises providing a thermoplastic foam substrate, and then forming a thermoplastic foam polishing body with a grafted surface by including those steps described above. A polishing pad is then formed from the thermoplastic foam polishing body that is suitable for polishing a semiconductor wafer or integrated circuit using the grafted surface.

In still another embodiment, the present invention provides a polishing apparatus. This particular embodiment includes a mechanically driven carrier head, a polishing platen, and a polishing pad attached to the polishing platen. The carrier head is positionable against the polishing platen to impart a polishing force against the polishing platen. The polishing pad includes a polishing body comprising a material wherein the material is a thermoplastic foam polymer.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
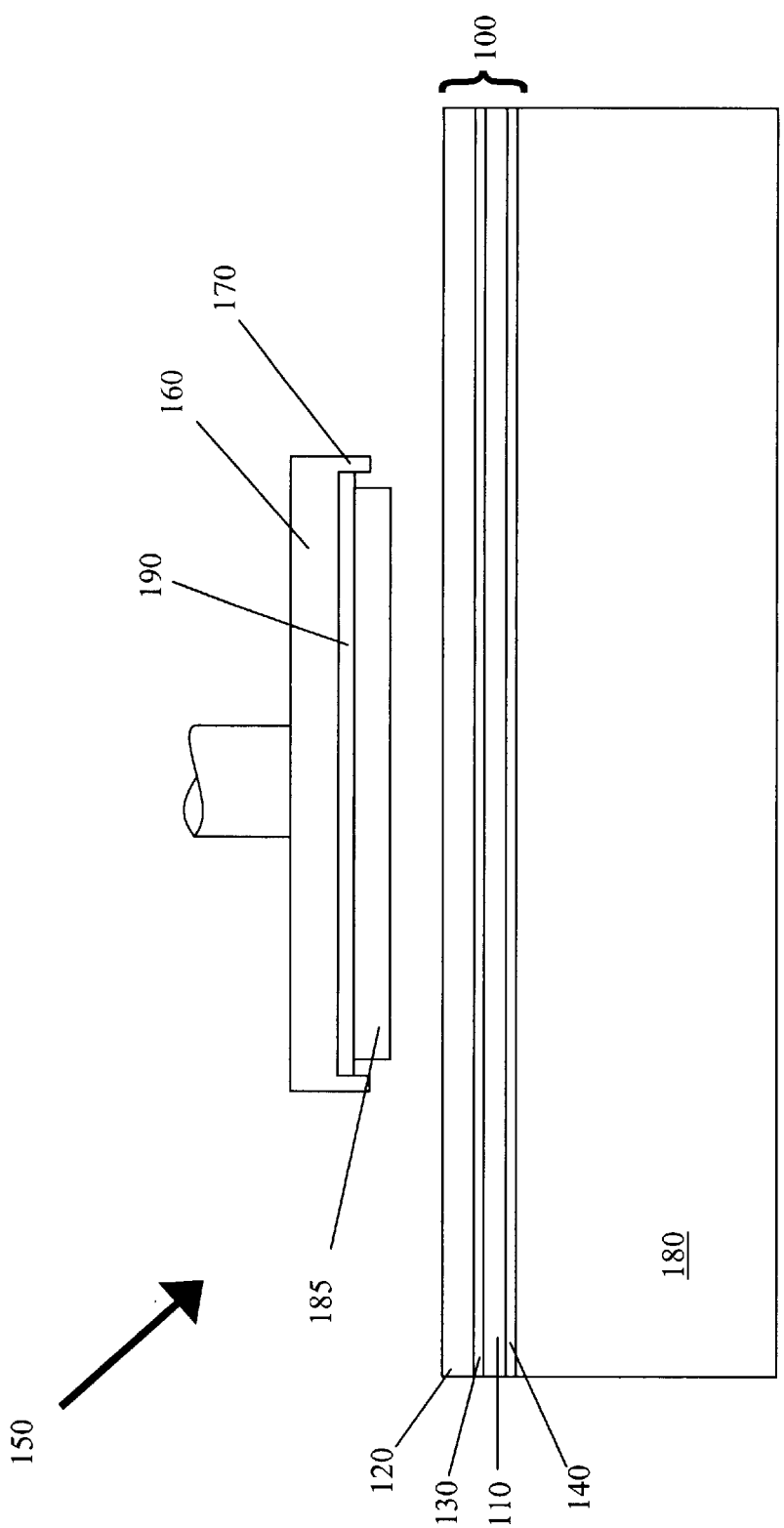
FIG. 1 illustrates a polishing apparatus, including a polishing pad fabricated using a thermoplastic foam polymer made according to the present invention.

Conditions have been discovered for producing a polymer, preferably thermoplastic foam polymer, having desirable polishing properties. The thermoplastic foam polymer, for example, comprises a thermoplastic foam substrate having a modified surface and a grafted surface on the modified surface. This polymer is produced, for example, by subjecting a thermoplastic foam substrate to a first plasma treatment to produce a modified surface, thereby allowing the grafting of various functional groups onto the substrate's modified surface in a second plasma treatment. Such treatments are facilitated using inert gas plasmas such Helium, Neon or Argon. The thermoplastic foam polymers of the present invention may also be produced using more reactive plasma gases, such as oxygen. In certain embodiments, the functional effects of grafting decline over a period of three to twenty days, as determined by water contact angle measurements, while in other embodiments these functional effects are preserved. The polymers of the present invention are ideally suited for use as pads in CMP applications.

It is believed that exposing polymers, such as thermoplastic foam substrates, to an initial plasma reactant creates ruptured single bonds, existing on the polymer surface regime as excited states. Due to the low mobility and limited vibrational degrees of freedom within the polymer matrix, these triplet sites lack the ability to undergo intersystem crossing and return to ground state for short periods of time. Based on the ability of the plasma surface to show large macro effects, excited state sites are likely present in abundance at the modified surface.

The excited state sites generated by exposing polymers, such as thermoplastic foam polymers, to the initial plasma reactant are thought to provide an attractive base on which to selectively graft polymerized numerous inorganic and organic materials. The modified surface of the polymer incorporating such functional groups is designated as a grafted surface. Such grafted surfaces are particularly useful in CMP processes due to the grafting process's ability to introduce very fine hard groups onto the grafted surface, which is then incorporated into a polishing pad. Such pads may enable the use of reduced or no abrasive slurries, which may improve thermal management. Additionally, the grafting process produces thermoplastic foam polymers with certain desirable physical and chemical properties, such as controlled wetability surfaces, and renders such grafted surfaces permanent. Still other thermoplastic foam polymers may contain grafted functional groups that change the nanoscale morphology of a pad surface, while leaving the bulk properties of the thermoplastic polymer relatively intact.

As noted above, polymers, such as thermoplastic polymers are produced according to the present invention by a process whereby a thermoplastic foam substrate is exposed to primary and secondary plasma mixtures introduced into a conventional plasma generating apparatus. In certain embodiments, the thermoplastic foam substrate is preferably composed of polyurethane, polyolefin or polyvinyl esters. Alternative embodiments of the thermoplastic foam substrate may be, for example, polyurea, polycarbonate, aliphatic polyketone, polysulfone, aromatic polyketone, 6,6 nylon, 6,12 nylon or polyamide. In other preferred embodiments, the substrate may be thermoplastic rubber or melt-processible rubber. However embodiments where the substrate is composed of closed-cell polypropylene, polyethylene, crosslinked polyethylene, ethylene vinyl acetate, or polyvinylacetate are also within the scope of the present invention.

One skilled in the art will be familiar with reagents suitable for producing conventional primary plasma mixtures. For instance, conventional mixtures often include noble gases such as Helium, Neon or Argon; or ammonia, oxygen, or water. In the present invention, the plasma treatment is continued in the presence of a secondary plasma mixture to graft various functional groups onto the polymer surface, depending on the secondary plasma reactant used.

One group of such secondary plasma reactants are oxygen-containing organometallic reactants that produce a grafted surface that includes an inorganic metal oxide. In such embodiments, the secondary plasma mixture typically includes a transition metal such as titanium, manganese, or tantalum. However, any metal element capable of forming an oxygen containing organometallic compound and capable of being grafted to the polymer surface is suitable. Silicon may also be employed as the metal portion of the organometallic secondary plasma mixture. In these embodiments, the organic portion of the organometallic reagent may be an ester, acetate, or alkoxy fragment. The secondary plasma reagent may optionally include ozone, alkoxy silanes, water, ammonia, alcohols, mineral sprits or hydrogen peroxide. For example, in preferred embodiments, the secondary plasma reactant may be composed of titanium esters, tantalum alkoxides, including tantalum alkoxides wherein the alkoxide portion has 1–5 carbon atoms; manganese acetate solution in water; manganese alkoxide dissolved in mineral spirits; manganese acetate; manganese acetylacetonate; aluminum alkoxides; alkoxy aluminates; zirconium alkoxides, wherein the alkoxide has 1–5 carbon atoms; alkoxy zirconates; magnesium acetate; and magnesium acetylacetonate. Other embodiments are also contemplated for the secondary plasma reactant, for example, alkoxy silanes and ozone, alkoxy silanes and ammonia, titanium esters and water, titanium esters and alcohols, or titanium esters and ozone.

Another group of secondary plasma reactants produce grafted surfaces having super hydrated, controlled wetability, and designed alkalinity surface properties. For example, in preferred embodiments, the secondary plasma reactant may be composed of water, aliphatic alcohols, or aliphatic polyalcohols. In other embodiments, the secondary plasma reactant may be hydrogen peroxide, ammonia, or oxides of nitrogen. Yet other embodiment include hydroxylamine solution, hydrazine, sulfur hexafluoride as the secondary plasma reactant. One skilled in the art, however, will recognize that other similar materials, including other organic alcohols or polyalcohols, may produce these desired surface properties when grafted onto the polymer's surface, and thus, are within the scope of the present invention.

Yet another group of secondary plasma reactants result in organic grafted surfaces. For example, in preferred embodiments, the secondary plasma reactant may be composed of allyl alcohols; allyl amines; allyl alkylamines, where the alkyl groups contain 1–8 carbon atoms; allyl ethers; secondary amines, where the alkyl groups contain 1–8 carbon; alkyl hydrazines, where the alkyl groups contain 1–8 carbon atoms; acrylic acid; methacrylic acid; acrylic acid esters containing 1–8 carbon atoms; methacrylic esters containing 1–8 carbon atoms; or vinyl pyridine, and vinyl esters, for example, vinyl acetate.

The conditions of plasma treatment via Radio Frequency Glow Discharge (RFGD) must be carefully chosen to avoid damaging the grafted layer, and to achieve long-lasting grafts. For example, high power plasmas may cause polymer surfaces to crack. See e.g., Owen, M. J. & Smith, P. J. in POLYMER SURFACE MODIFICATION: RELEVANCE TO ADHESION, 3–15 (K. L. Mittal, ed., 1995), incorporated herein by reference as if reproduced herein in its entirety. As further illustrated in experiments described below, the exact grafting conditions depend on factors including the type of polymer specimen, radio frequency and power, and the identity of the primary and secondary plasma reactants. However, typical preferred plasmagrafting process conditions include exposing the thermoplastic foam substrate to a primary plasma reactant treatment time (TT-1) from about 30 s to about 30 min, in a reaction chamber having a pressure ranging from about 130 to about 340 mTorr, and plasma back pressure (PBP) ranging from about 140 to about 200 mTorr. Subsequent exposure of the modified substrate surface to the secondary plasma reactant for similar treatment times (TT-2) and pressures also include a diluting inert gas, where the inert gas to secondary plasma reactant ratio typically ranges from about 1:1 to about 3:1, the dilutant inert gas being introduced into the reaction chamber at a flow rate of about 0.03 to about 1.0 standard liters per min (SLM). The amount of secondary reactant monomer in the gas stream is governed by the monomer vapor pressure (MBP), and the monomer reservoir temperature (MRT), typically ranging from about 20 to about 75° C. The resulting pressure in the reaction chamber during grafting (GP) may range from about 135 to about 340 mTorr, and out gas back pressure (OGBP) may range from about 55 to 70 mTorr. Throughout, the RDGD electrode may be maintained at a constant value within the range of room temperature to about 100° C. One of ordinary skill in the art understands that conditions outside of the above-cited ranges may also be used to produce the subject matter of the present invention.

Polishing pads in certain embodiments of the present invention may be manufactured by first melting a thermoplastic polymer pellets in an extrusion apparatus such as a melt extruder, and blowing gas into the melt to form a thermoplastic foam substrate. The substrate may be formed into pads by techniques well known to those skilled in the art, such as laser cutting or die cutting. The substrate is next formed into a thermoplastic foam polishing body by first exposing the substrate to an initial plasma reactant to produce a modified surface and then exposing the modified surface to a secondary plasma reactant to create a grafted surface on the modified surface. Finally, the polishing body may be incorporated into a pad such that the grafted surface is suitability situated to polish a semiconductor wafer or integrated circuit.

Polishing pads may be employed in a variety of CMP polishing apparatus 150, one embodiment of which is displayed in FIG. 1. The thermoplastic foam polymers of the present invention may be incorporated into a polishing body 100 that includes a base pad 110, where a thermoplastic foam polymer 120 forms a polishing surface located over the base pad 110. Optionally, a first adhesive material 130, such as acrylate-based, silicone-based, epoxy or other materials well known to those skilled in the art, may be used to couple the base pad 110 to the thermoplastic foam polymers 120. The polishing pads thus formed may also have a second adhesive material 140, well known to those skilled in the art, applied to the platen side. The polishing pad may then be cleaned and packaged for use.

With continuing reference to FIG. 1, the polishing body 100 may then be employed in a variety of CMP processes by incorporation into a polishing apparatus 150. The polishing apparatus 150 typically includes a conventional mechanically driven carrier head 160, a conventional carrier ring 170, a conventional polishing platen 180, and a polishing pad that includes the polishing body 100 comprising the thermoplastic foam polymer 120 of the present invention, attached to the polishing platen 180, optionally using the second adhesive 140. The substrate to be polished 185, typically a wafer, may be attached to the carrier ring with the aid of a third a conventional adhesive 190. The carrier head 160 is then positioned against the polishing platen 180 to impart a polishing force against the polishing platen 180, typically a repetitive, regular motion of the mechanically driven carrier head 160, while providing an appropriate conventional slurry mixture. Optionally, in certain embodiments of the thermoplastic foam polymer 120, the slurry may be omitted.

With continuing reference to FIG. 1, in such polishing processes, a substrate 185 may be polished by positioning the substrate 185, having at least one layer, on to the above-described polishing apparatus 150, and polishing the layer against the thermoplastic foam polymer 120 of the present invention. In one embodiment, the substrate 185 has at least one layer of material that is a metal layer. In particular embodiments, the metal layer may be is copper or tungsten. In another embodiment, the substrate 185 may be a silicon, polysilicon or dielectric material located on a semiconductor wafer. Thermoplastic foam polymers 120 of the present invention are particularly suited for polishing in shallow trench isolation (STI), interlevel dielectrics, and metal interconnects in integrated circuit fabrication or other fabrication techniques where large areas of field oxide, other dielectrics or metal must be removed from the wafer to produce a planar surface prior to subsequent processing. The thermoplastic foam polymers 120 of the present invention are also desirable for polishing metalization materials such as W, Ti, Cu, Al, and other metals as well as nitrides or barrier materials such as $Si_3N_4$. TaN, TiN.

Experiments

Measurements of solvent contact angles provides a particularly useful means to measure to extent and stability of grafts providing controlled wetability surfaces. Wetability, typically measured by measuring the contact angle of a water droplet, provides an indication of surface energy. A hydrophilic surface having a high surface energy will have a low contact angle. Thermoplastic foam polymers made according to the present invention were examined for changes in water contact angle, by comparing pre- and post-plasma treatment angles, typically for several days following plasma treatment, using commercial instruments (Rame-Hart Goniometer, Mountain Lakes, N.J.; and Accu-Dyne-Test Marker Pen, Diversified Enterprises, Claremont, N.H.).

Several such experiments were performed using approximately 2" by 2" sheets of 0.125" thick thermoplastic elastomer foam (Santoprene® D-40; Advanced Elastomer Systems, LP, Akron, Ohio). The Santoprene® D-40 sheets were manually cleaned with an aqueous/isopropyl alcohol solution, and then placed in the reaction chamber of a conventional commercial RFGD plasma reactor having a temperature controlled electrode configuration (Model PE-2; Advanced Energy Systems, Medford, N.Y.).

In one experiment, for comparison purposes, plasma treatment consisted of exposing the Santoprene® D-40 substrate to only a primary plasma reactant, comprising Helium:Oxygen, 60:40, for 10 minutes, with the reaction chamber maintained at 230 mTorr pressure, the electrode temperature maintained below about 100° C. and using a RF operating power of 2500 Watts. Surface modification was confirmed by the observation of an increased hydrogen and oxygen content to a depth of 100 Angstroms, as measured by Electron Spectroscopy Chemical Analysis (ESCA).

While the pre-treatment water contact angle of the Santoprene® D-40 substrate was 98°, the immediate post-treatment angle was 25°. The contact angle, however, subsequently rose to and stabilized at 60° by 6 days after treatment. Similar results were obtained in a second experiment, when the Santoprene® D-40 substrate was exposed to a primary plasma reactant of 100% ammonia. The water contact angle was 40° immediately following plasma treatment, but progressively rose to and stabilized at 80° by 6 days post-treatment.

In a third experiment, the plasma treatment of the Santoprene® D-40 substrate was commenced by introducing the primary plasma reactant, Argon, for 30 seconds within the reaction chamber maintained at 350 mTorr. The electrode temperature was maintained at 30° C., and an RF operating power of 300 Watts was used. Subsequently, the secondary reactant was introduced for either 10 or 30 minutes at 0.10 SLM and consisted of either Tetraethoxy Silane (TEOS), Titanium Alkoxide (TYZOR), Allyl-Alcohol (Allyl-OH), or Allyl-Amine ($ALLYL-NH_2$)vapor mixed with He or Ar gas (TABLE 1). In this, and analogous experiments described below, the amount of secondary reactant in the gas stream was governed by the vapor back pressure (BP) of the secondary reactant monomer at the monomer reservoir temperature (MRT; 50±10° C.). The monomer-carrier gas mixture was further diluted with a separate stream of either argon or helium in the reactor chamber. The pre-and post-plasma treatment water contact angles, shown in TABLE 1, reveal substantially lower immediate post-treatment contact angles as compared to previously described Santoprene® D-40 substrates treated with the primary plasma reactant only.

TABLE 1

| Secondary Plasma Reactant | TT-2 (min) | Pre-Treatment Contact Angle (°) | Immediate Post-Treatment Contact Angle (°) | Seven Day Post-Treatment Contact Angle (°) |
| --- | --- | --- | --- | --- |
| TYZOR | 10 | 98 | 0 | 36 |
| TYZOR | 30 | 98 | 0 | 65 |
| TEOS | 30 | 98 | 0 | 90 |
| Allyl-OH | 30 | 98 | 0 | 90 |
| Allyl-$NH_2$ | 30 | 98 | 65 | 75 |

Similar results were obtained in a fourth experiment, where Santoprene® D-40 was exposed to a primary plasma reactant of Argon mixture for 30 second at 100 mTorr and 50 Watts RF power, with the electrode maintained at 40° C., and was exposed to a secondary plasma reactant of 100% ammonia. The pre-treatment water contact angle of 98° was reduced to 40° immediately following treatment, with the angle increasing to and stabilizing at 60° by 6 days post-treatment.

In a fifth experiment using Santoprene® D-40 as the substrate, plasma treatment was commenced by introducing the primary plasma reactant, Helium, for 10 minutes with the reaction chamber maintained at 350 mTorr pressure, the electrode temperature below about 100° C. and RF operating power of 3500 Watts was used. This was followed by a second 10 minute plasma treatment under the same conditions while introducing a secondary plasma reactant containing tetraethoxyorthosilicate at 0.10 SLM into the gas stream. The immediate post-treated surface modified thermoplastic foam substrate had a water contact angle of 0°, as compared to 92° for the pre-treated substrate.

In a sixth experiment, 1 inch by 1 inch sheets of 0.063 inch thick cross-linked polypropylene foam (type TPR, from Merryweather Foams Inc., Anthony, N. Mex.) was plasma treated under the same conditions as described for Experiment 5. The immediate post-treated surface modified thermoplastic foam substrate had a water contact angle of 0°, as compared to 90° for the pre-treated substrate.

By careful manipulation of the plasma treatment conditions, the grafts can be preserved for longer periods, as indicated by the stability of water contact angle changes. This is illustrated by a seventh series of experiments conducted on the above-described polypropylene sheets having dimensions of 6 inch by 6 inch by 0.125 inch thickness, under the plasma treatment conditions presented in Table 2. Cold BP (Cold Back Pressure) is measured with the RF power off, while PBP (Power Back Pressure) is with the RF power on. In experiments 12 and 13, PBP was not recorded (n.r.).

TABLE 3

| Sample Number | Pre-treatment Contact Angle (°) | Post-treatment Contact Angle (°) | | | |
|---|---|---|---|---|---|
| | | 0 days | 3 days | 7 days | 10 days |
| 1 | 90 | 45 | 47 | 50 | 50 |
| 2 | 90 | 58 | 65 | 67 | 65 |
| 3 | 90 | 80 | 73 | 73 | 76 |
| 4 | 90 | 30 | 42 | 45 | 45 |
| 5 | 90 | 80 | 75 | 75 | 77 |
| 6 | 90 | 70 | 73 | 73 | 76 |
| 7 | 90 | 70 | 80 | 75 | 76 |
| 8 | 90 | 68 | 70 | 75 | 76 |
| 9 | 90 | 75 | 77 | 77 | 75 |
| 10 | 90 | 75 | 77 | 77 | 76 |
| 11 | 90 | 48 | 52 | 59 | 62 |
| 12 | 90 | 70 | 77 | 75 | 65 |
| 13 | 90 | 73 | 78 | 75 | 80 |

In an eighth experiment, the polishing efficiency of a pad manufactured according to this invention was compared to a conventional polishing pad. A polishing pad was prepared by exposing Aliplast® (JMS Plastic Supplies, Neptune, N.J.; Type 6A: medium foam density and hardness 34 Shore A), a thermoplastic heat moldable cross-linked polyethylene closed-cell foam, to the above-described grafting process. Specifically, secondary plasma reactants, containing either Allyl-Alcohol, or Allyl-Amine, Tetraethoxy Silane (TEOS), or tetraisopropyl-titanate (TYZOR TPT) monomers, were grafted onto the modified Aliplast® substrate, under conditions similar to Sample number 4 shown in Table 1, to produce pads designated as A32AA, A32AN, A32S, and A32T, respectively. The blanket Copper (Cu) polishing properties of pads fashioned from these polymers were compared to the untreated Aliplast® substrate (designated A32), and to a commercially available IC1000/SUBA IV pad stack (Rodel, Phoenix, Ariz.).

TABLE 2

| Sample Number | TT-1 (min) | OGBP (mTorr) | Ar dilutant Flow Rate (SLM) | Cold BP (mTorr) | PBP (mTorr) | GP (mTorr) | MRT (° C.) | Grafting RF Power (Watts) |
|---|---|---|---|---|---|---|---|---|
| 1 | 1 | 60 | 0.03 | 120 | 140 | 200 | 50 | 50 |
| 2 | 1 | 60 | 0.03 | 120 | 140 | 300 | 50 | 50 |
| 3 | 1 | 65 | 0.10 | 190 | 207 | 280 | 70 | 50 |
| 4 | 1 | 65 | 0.03 | 120 | 150 | 250 | 50 | 100 |
| 5 | 1 | 70 | 0.03 | 125 | 160 | 320 | 50 | 100 |
| 6 | 1 | 70 | 0.03 | 125 | 160 | 200 | 55 | 100 |
| 7 | 1 | 60 | 0.10 | 180 | 200 | 245 | 50 | 100 |
| 8 | 1 | 60 | 0.10 | 180 | 200 | 340 | 55 | 100 |
| 9 | 1 | 60 | 0.03 | 105 | 125 | 150 | 60 | 50 |
| 10 | 1 | 55 | 0.03 | 105 | 125 | 220 | 50 | 50 |
| 11 | 1 | 60 | 0.01 | 90 | 105 | 130 | 75 | 50 |
| 12 | 0 | 55 | 0.03 | 110 | n.r. | 135 | 21 | 50 |
| 13 | 1 | 55 | 0.03 | 110 | n.r. | 165 | 60 | 50 |

As shown in Table 3, post-treated substrates produced under the conditions described in Table 2 retained their low water contact angles for at least 10 days of exposure to laboratory atmospheric conditions.

The comparison was performed using an CETR CMP simulator (Center For Tribology, Inc., Campbell, Calif. Conditions for thermal oxide polishing include using a down force of 3 psi; table speeds of 0.8 m/min; and a conventional slurry comprising K1501 and polishing time of 5 min. Conditions for copper polishing include using a down force of 3 psi; table speeds of 0.8 m/min; and a conventional slurry comprising Cabot EP-5001 containing 3% hydrogen peroxide and adjusted to a pH of about 4, and polishing time of 5 min. Plasma Enhanced Tetraethylorthosilicate (PE-TEOS) 5,000 Å wafers having a deposited 20,000 Å copper surface and an underlying 250 Å thick tantalum barrier layer were used for test polishing.

Cu removal rates for the A32AA, A32AN and A32T pads were about 10,000; 7,500; and 7,200 Å/min, respectively. The corresponding Ta removal rates were only 216, 215 and 175 Å/min, respectively. In comparison, the untreated A32 pad removed Cu at a rate of about 3,200 Å/min. The high selectivity of the grafted Aliplast® pads for Cu polishing compared to Tantalum (Ta) polishing may be expressed by the ratio of Cu to Ta removal rates. For the A32AA, A32AN and A32T pads, the selectivity ratio was about 46, 35 and 41, respectively. In comparison, the Cu and Ta removal rates of an IC1000/SUBA IV pad stack were about 5,700 Å/min and about 170 Å/min, respectively, giving a Cu:Ta selectivity of about 34.

Although the present invention has been described in detail, those skilled in the art should understand that they can make various changes, substitutions and alterations herein without departing from the spirit and scope of the invention in its broadest form.

What is claimed is:

1. A polishing pad made by the process, comprising:

providing a thermoplastic foam substrate;

exposing said substrate to an initial plasma reactant to produce a modified surface thereon; and exposing said modified surface to a secondary plasma reactant to create a grafted surface on said modified surface wherein an electrode temperature is maintained between about 20° C. and about 100° C. during said exposing of said substrate and said modified surface.

2. The polishing pad as recited in claim 1 wherein said thermoplastic foam substrate is selected from the group consisting of:

polyurethane;

polyolefin; and polyvinyl esters.

3. The polishing pad as recited in claim 1 wherein said thermoplastic foam substrate is selected from the group consisting of:

polyurea;

polycarbonate;

aliphatic polyketone;

polysulfone;

aromatic polyketone;

6,6 nylon;

6,12 nylon; and polyamide.

4. The polishing pad as recited in claim 1 wherein said thermoplastic foam substrate is selected from the group consisting of:

thermoplastic rubber; and melt-processible rubber.

5. The polishing pad as recited in claim 1 wherein said thermoplastic foam substrate is selected from the group consisting of:

polypropylene;

polyethylene;

crosslinked polyethylene;

ethylene vinyl acetate; and polyvinylacetate.

6. The polishing pad as recited in claim 1 wherein said modified surface is modified by said primary plasma reactant selected from a group of inert gas plasmas consisting of:

Helium

Neon; and

Argon.

7. The polishing pad as recited in claim 1 wherein said grafted surface includes an inorganic metal oxide surface.

8. The polishing pad as recited in claim 7 wherein said inorganic metal oxide surface is created by exposure to said secondary plasma reactant selected from a group of reactive agents consisting of:

titanium esters;

tantalum alkoxides;

manganese acetate;

manganese alkoxide;

manganese acetylacetonate;

aluminum alkoxides;

alkoxy aluminates;

zirconium alkoxides;

alkoxy zirconates;

magnesium acetate; and magnesium acetylacetonate.

9. The polishing pad as recited in claim 7 wherein said inorganic metal oxide surface is created by exposure to said secondary plasma reactant selected from a group of reactive agents consisting of:

titanium esters plus water;

titanium esters plus alcohols;

titanium esters plus ozone;

alkoxy silanes plus ozone; and alkoxy silanes plus ammonia.

10. The polishing pad as recited in claim 1 wherein said grafted surface includes a controlled wetability surface.

11. The polishing pad as recited in claim 10 wherein said controlled wetability surface is created by exposure to said secondary plasma reactant selected from a group of reactive agents consisting of:

water;

aliphatic alcohols; and aliphatic polyalcohols.

12. The polishing pad as recited in claim 10 wherein said controlled wetability surface is created by exposure to said secondary plasma reactant selected from a group of reactive agents consisting of:

hydrogen peroxide;

ammonia; and oxides of nitrogen.

13. The polishing pad as recited in claim 10 wherein said controlled wetability surface is created by exposure to said secondary plasma reactant selected from a group of reactive agents consisting of:
   hydroxylamine solution; and
   sulfur hexafluoride.

14. The polishing pad as recited in claim 1 wherein said grafted surface on said thermoplastic foam substrate includes an organic grafted surface.

15. The polishing pad as recited in claim 14 wherein said organic grafted surface is created by exposure to said secondary plasma reactant selected from a group of reactive agents consisting of:
   allyl alcohols;
   allyl amines;
   allyl alkylamines, where the alkyl groups contain 1–8 carbon atoms;
   allyl ethers;
   secondary amines, where the alkyl groups contain 1–8 carbon atoms;
   alkyl hydrazines, where the alkyl groups contain 1–8 carbon atoms;
   acrylic acid;
   methacrylic acid;
   acrylic acid esters containing 1–8 carbon;
   methacrylic esters containing 1–8 carbon;
   vinyl pyridine;
   vinyl esters.

16. A method of manufacturing a polishing pad, comprising:
   providing a thermoplastic foam substrate;
   forming a thermoplastic foam body by a process including:
      exposing said thermoplastic foam substrate to an initial plasma reactant to produce a modified surface thereon; and
      exposing said modified surface on said thermoplastic foam substrate to a secondary plasma reactant to create a grafted surface on said modified surface; and
   forming a polishing pad from said thermoplastic foam body suitable for polishing a semiconductor wafer or integrated circuit using said grafted surface.

17. The method of manufacturing the polishing pad as recited in claim 16 wherein said thermoplastic foam substrate is provided by extruding a thermoplastic foam substrate from an extrusion apparatus to form said thermoplastic foam substrate.

18. The method of manufacturing the polishing pad as recited in claim 16 wherein said thermoplastic foam substrate is selected from the group consisting of:
   polyurethane;
   polyolefin; and
   polyvinyl esters.

19. The method of manufacturing the polishing pad as recited in claim 16 wherein said thermoplastic foam substrate is selected from the group consisting of:
   polyurea;
   polycarbonate;
   aliphatic polyketone;
   polysulfone;
   aromatic polyketone;
   6,6 nylon;
   6,12 nylon; and
   polyamide.

20. The method of manufacturing the polishing pad as recited in claim 16 wherein said thermoplastic foam substrate is selected from the group consisting of:
   thermoplastic rubber; and
   melt-processible rubber.

21. The method of manufacturing the polishing pad as recited in claim 16 wherein said thermoplastic foam substrate is selected from the group consisting of:
   polypropylene;
   polyethylene;
   crosslinked polyethylene;
   ethylene vinyl acetate; and
   polyvinylacetate.

22. The method of manufacturing the polishing pad as recited in claim 16 wherein said primary plasma reactant is selected from the group of inert gas plasmas consisting of:
   Helium;
   Neon; and
   Argon.

23. The method of manufacturing the polishing pad as recited in claim 16 wherein said grafted surface includes an inorganic metal oxide surface.

24. The method of manufacturing the polishing pad recited in claim 23 wherein said inorganic metal oxide surface is created by exposure of said modified surface to said secondary plasma reactant selected from the group of reactive agents consisting of:
   titanium esters;
   tantalum alkoxides;
   manganese acetate;
   manganese alkoxide;
   manganese acetylacetonate
   aluminum alkoxides;
   alkoxy aluminates;
   zirconium alkoxides;
   alkoxy zirconates;
   magnesium acetate; and
   magnesium acetylacetonate.

25. The method of manufacturing the polishing pad recited in claim 23 wherein said inorganic metal oxide surface is created by exposure of said modified surface to said secondary plasma reactant selected from the group of reactive agents consisting of:
   titanium esters plus water;
   titanium esters plus alcohols;
   titanium esters plus ozone;
   alkoxy silanes plus ozone; and
   alkoxy silanes plus ammonia.

26. The method of manufacturing the polishing pad as recited in claim 23 wherein said grafted surface on said thermoplastic foam substrate includes a controlled wetability surface.

27. The method of manufacturing the polishing pad as recited in claim 26 wherein said controlled wetability surface is created by exposure of said modified surface to said secondary plasma reactant selected from the group of reactive agents consisting of:
   water;
   aliphatic alcohols; and
   aliphatic polyalcohols.

28. The method of manufacturing the polishing pad as recited in claim 26 wherein said controlled wetability surface is created by exposure of said modified surface to said secondary plasma reactant selected from the group of reactive agents consisting of:

hydrogen peroxide;

ammonia; and oxides of nitrogen.

29. The method of manufacturing the polishing pad as recited in claim 26 wherein said controlled wetability surface is created by exposure of said modified surface to said secondary plasma reactant selected from the group of reactive agents consisting of:

hydroxylamine solution; and sulfur hexafluoride.

30. The method of manufacturing the polishing pad as recited in claim 16 wherein said grafted surface includes an organic grafted surface.

31. The method of manufacturing the polishing pad as recited in claim 30 wherein said organic grafted surface is created by exposure of said modified surface to said secondary plasma reactant selected from the group of reactive agents consisting of:

allyl alcohols;

allyl amines;

allyl alkylamines, where the alkyl groups contain 1–8 carbon atoms;

allyl ethers;

secondary amines, where the alkyl groups contain 1–8 carbon atoms;

alkyl hydrazines, where the alkyl groups contain 1–8 carbon atoms;

acrylic acid;

methacrylic acid;

acrylic acid esters containing 1–8 carbon;

methacrylic esters containing 1–8 carbon;

vinyl pyridine;

vinyl esters.

32. A polishing apparatus comprising:

a mechanically driven carrier head;

a polishing platen, said carrier head being positionable against said polishing platen to impart a polishing force against said polishing platen; and a polishing pad attached to said polishing platen and including a polishing body comprising a material wherein said material is a thermoplastic foam substrate having a modified surface thereon; and a grafted surface on said modified surface.

33. The polishing apparatus as recited in claim 32 wherein said thermoplastic foam substrate is selected from the group consisting of:

polyurethane;

polyolefin; and polyvinyl esters.

34. The polishing apparatus as recited in claim 32 wherein said thermoplastic foam substrate is selected from the group consisting of:

polyurea;

polycarbonate;

aliphatic polyketone;

polysulfone;

aromatic polyketone;

6,6 nylon;

6,12 nylon; and polyamide.

35. The polishing apparatus as recited in claim 32 wherein said thermoplastic foam substrate is selected from the group consisting of:

thermoplastic rubber; and melt-processible rubber.

36. The polishing apparatus as recited in claim 32 wherein said thermoplastic foam substrate is selected from the group consisting of:

polypropylene;

polyethylene;

crosslinked polyethylene;

ethylene vinyl acetate; and polyvinylacetate.

37. The polishing apparatus as recited in claim 32 wherein said modified surface is modified by a primary plasma reactant selected from a group of inert gas plasmas consisting of:

Helium;

Neon; and

Argon.

38. The polishing apparatus as recited in claim 32 wherein said grafted surface includes an inorganic metal oxide surface.

39. The polishing apparatus as recited in claim 38 wherein said inorganic metal oxide surface is created by exposure to a secondary plasma reactant selected from a group of reactive agents consisting of:

titanium esters;

tantalum alkoxides;

manganese acetate;

manganese alkoxide;

manganese acetylacetonate aluminum alkoxides;

alkoxy aluminates;

zirconium alkoxides;

alkoxy zirconates;

magnesium acetate; and magnesium acetylacetonate.

40. The polishing apparatus as recited in claim 38 wherein said inorganic metal oxide surface is created by exposure to a secondary plasma reactant selected from a group of reactive agents consisting of:

titanium esters plus water;

titanium esters plus alcohols;

titanium esters plus ozone;

alkoxy silanes plus ozone; and alkoxy silanes plus ammonia.

41. The polishing apparatus as recited in claim 32 wherein said grafted surface includes a controlled wetability surface.

42. The polishing apparatus as recited in claim 41 wherein said controlled wetability surface is created by exposure to a secondary plasma reactant selected from a group of reactive agents consisting of:

water;

aliphatic alcohols; and aliphatic polyalcohols.

43. The polishing apparatus as recited in claim 42 wherein said controlled wetability surface is created by exposure to a secondary plasma reactant selected from a group of reactive agents consisting of:

hydrogen peroxide;

ammonia; and oxides of nitrogen.

44. The polishing apparatus as recited in claim 41 wherein said controlled wetability surface is created by exposure to a secondary plasma reactant selected from a group of reactive agents consisting of:

hydroxylamine solution; and sulfur hexafluoride.

45. The polishing apparatus as recited in claim 32 wherein said grafted surface on said thermoplastic foam substrate includes an organic grafted surface.

46. The polishing apparatus as recited in claim 45 wherein said organic grafted surface is created by exposure to a secondary plasma reactant selected from a group of reactive agents consisting of:

allyl alcohols;

allyl amines;

allyl alkylamines, where the alkyl groups contain 1–8 carbon atoms;

allyl ethers;

secondary amines, where the alkyl groups contain 1–8 carbon atoms;

alkyl hydrazines, where the alkyl groups contain 1–8 carbon atoms;

acrylic acid;

methacrylic acid;

acrylic acid esters containing 1–8 carbon;

methacrylic esters containing 1–8 carbon;

vinyl pyridine;

vinyl esters.

47. The polishing pad as recited in claim 1 wherein said polishing pad is a semiconductor wafer polishing pad.

* * * * *